United States Patent Office 3,190,311
Patented June 22, 1965

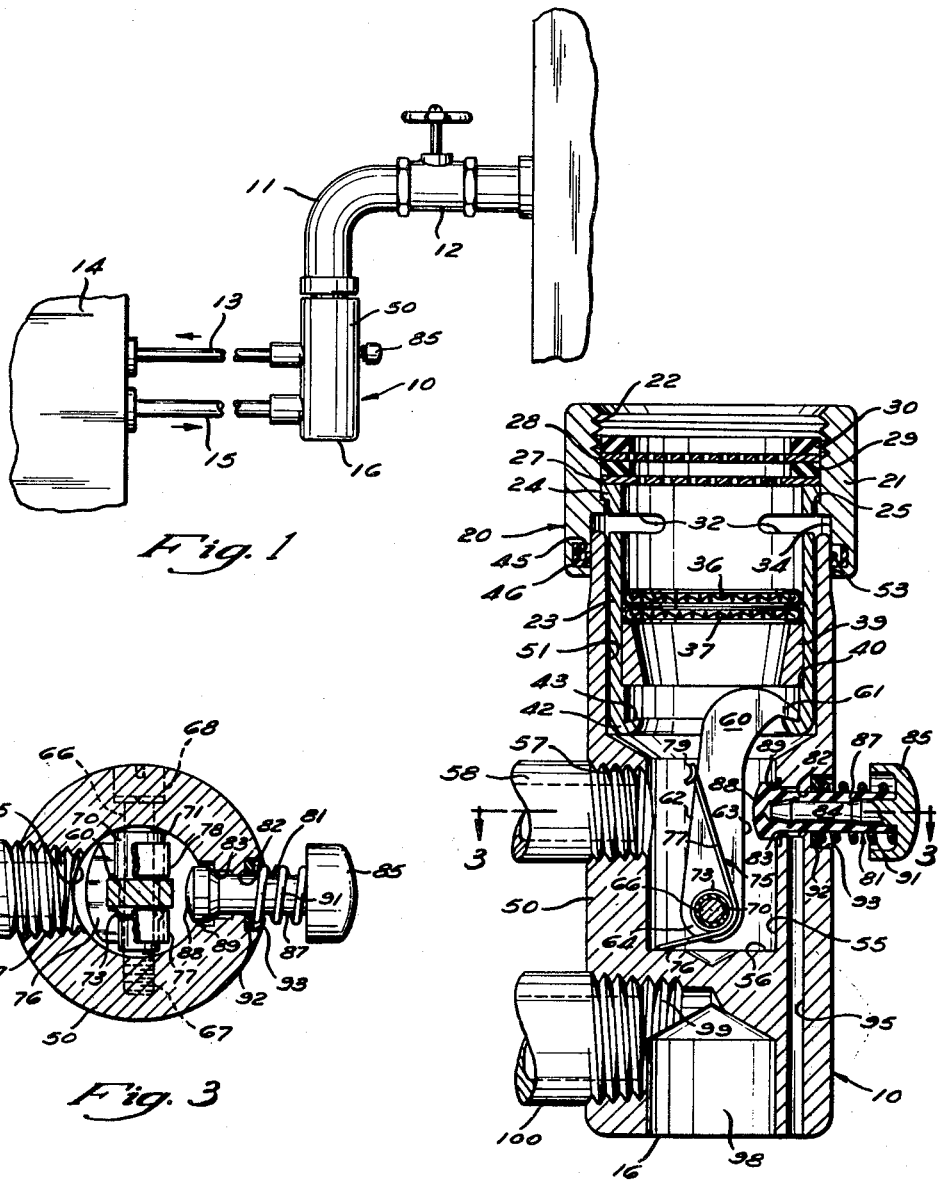

3,190,311
QUICK DISCONNECT COUPLING
Donald A. Boyce, Wickliffe, Basil S. Segro, Cleveland, and Philip W. Morse, Cleveland Heights, Ohio, assignors to The Weatherhead Company, Cleveland, Ohio, a corporation of Ohio
Filed Sept. 25, 1963, Ser. No. 311,429
4 Claims. (Cl. 137—583)

This invention relates generally to quick disconnect couplings for hoses and pipes and more particularly to a quick disconnect pipe coupling for low pressure fluids suitable for making temporary connections between a household appliance and a water outlet.

With certain types of household appliances such as portable dishwashing machines, it is desirable to arrange the water connections to these appliances for use with an ordinary water outlet such as may be found at a sink. Not only does this allow the appliance to be connected to a water source without providing separate pipes and connections directly to the appliance, but it also allows the use of a single line connection to a mixing valve type faucet which allows the temperature of the incoming water to be regulated by mixing water from the hot and cold lines as desired by the temperature of the water to be used in the appliance. Because these appliances also require a drain for the water supplied to them, these couplings are arranged to have a return line arranged to drain the water directly into the sink below the faucet through the normal drain and by the use of a downwardly directed outlet, the flow of outlet water is directed in the same direction as that from the faucet when the coupling is disconnected. It is particularly desired that such couplings be easily used by unskilled persons and that their connection and disconnection be achieved with a minimum of effort.

Another important consideration in this type of coupling is the need for bleeding off the residual pressure remaining in the lines before the coupling is disconnected to prevent any splashing of water and the possibility that when the coupling is unlatched it will be blown off the faucet with considerable force. The amount of this residual pressure may often be considerable because of the elastic nature of the flexible hoses usually employed in the connection between the coupling and the appliance. By providing a bleed to allow this residual pressure to be drained off prior to disconnecting the coupling from the faucet, the disconnection can be accomplished very simply and with a minimum of effort to unlatch the coupling.

All of the foregoing problems are solved in the coupling of this invention in which the bleed and disconnect functions are operated with a single actuating means to insure that the bleeding of the residual pressure in the lines will take place prior to the unlatching to positively prevent the coupling from being blown off suddenly by the residual pressure. The use of a simple push button type control to accomplish both the bleed and the disconnect allows one-handed operation for both connecting the coupling and disconnecting it with a simple motion. The incorporation of a positive latch type of connection insures that the coupling cannot be easily disconnected and that once in place it will be securely latched without any possibility of false latch position which might cause the coupling to be disconnected when the faucet is turned on. The venting or bleeding of the residual pressure is arranged to direct this flow into the normal outlet of the coupling to be drained in the normal manner and prevent any spraying or splashing which would be attendant with the use of a separate drain for the bleed. The arrangement of the present coupling is simple to allow easy operation and by its use of a minimum number of parts it can be manufactured at low cost and remain trouble free in use.

All of the foregoing features and advantages of this invention will readily become apparent to those skilled in the art upon a more complete understanding of the preferred embodiment shown in the accompanying drawings and described in the following detailed description.

In the drawings:
FIGURE 1 is a diagrammatic view showing a typical application of the coupling of this invention;
FIGURE 2 is a vertical cross-sectional view through the coupling shown in FIGURE 1; and
FIGURE 3 is a cross-sectional view taken on line 3—3 of FIGURE 2.

Referring now to the figures in greater detail, an installation showing the use of the coupling of this invention is shown in FIGURE 1. In a typical application of this coupling, the coupling is used for attaching to a water outlet to provide a supply of water to an appliance such as a portable dishwashing machine. In FIGURE 1 the coupling indicated generally at 10 is connected to a water supply pipe 11 which is provided with a separate shut-off valve 12 in the usual fashion. The coupling 10 has a first or inlet line 13 which is connected to the inlet of the appliance indicated at 14 while a drain line 15 is connected from the appliance 14 back to the coupling 10. When the coupling is in position as shown in FIGURE 1, the water coming from supply pipe 11 is diverted through the inlet line 13 to the appliance 14, and the drain flows back from the appliance through the drain line 15 to the coupling, where it is discharged from the bottom end 16. Thus, when the coupling is in position on the water supply to direct the water supply to the appliance, the drain is discharged directly downward from the normal position from which the water would flow from the inlet pipe so it is normally discharged into the sink or drain beneath the water supply in the same manner as the ordinary discharge from the water supply without the coupling present.

The coupling 10 is shown in greater detail in FIGURE 2 where it will be seen to include an adapter 20 having a ring 21 which is provided with internal threads 22 at the upper end so that it can be screwed on the threaded end of the water pipe or faucet. In addition to serving as a portion of the coupling, the adapter 20 is constructed to act as an aerator to mix air in with the water when the coupling is disconnected. A sleeve 23 is fitted within the ring 21 and at its upper end has a radial flange 24 which abuts against a shoulder 25 in the ring 21.

Directly above the sleeve 23 are located a pair of lower and upper orifice plates 27 and 28 together with lower and upper washers 29 and 30. The lower washer 29 serves to space the orifice plates 27 and 28 apart, while the upper washer 30, when the ring is threaded onto a faucet, abuts against the end of the faucet and by compression holds the orifice plates and the sleeve 23 in position within the adapter. The orifice plates 27 and 28 serve to reduce the turbulence in the water flowing into the adapter so as to permit the air entering the adapter to be mixed with the water as it is discharged at the lower end. To admit the air into the interior of the sleeve 23, the sleeve is provided with a pair of diametrically opposed aerator slots 32 which open outward through sleeve 23 into the upper end of a counterbore 34 extending upward in the lower end of ring 21. Within the sleeve 23, a pair of screens 36 and 37 are positioned within the sleeve a spaced distance below the aerator slots 32. These screens 36 and 37 rest on top of an orifice or nozzle insert 39 which is in turn supported on a shoulder 40 within the sleeve 23. At its lower end the sleeve 23 is provided with an inturned flange 42 having an upper edge 43 which slopes inwardly and upwardly for engagement with the latch on the adapter body as will be described in greater detail hereinafter.

The coupling body 50 is generally cylindrical in shape to extend coaxially with the adapter 20. Coupling body 50 has a bore 51 extending into the upper end to receive the projecting sleeve 23 on the adapter. At its upper end, coupling body 50 has a reduced diameter portion 53 adapted to fit within the counterbore 34 on ring 21. To provide a seal at this point, the counterbore 34 has a radially extending groove 45 within which is mounted a suitable seal ring 46 to make sealing engagement with the reduced portion 53 of the coupling body.

Directly below the bore 51, the coupling body 50 has a reduced diameter chamber 55 which terminates at its lower end in a closed bottom wall 56. A threaded outlet 57 extends radially through the wall of the coupling body 50 to connect the chamber 55 to the appliance by means of a suitable pipe or hose fitting 58. A latch 60 is mounted within the chamber 55 and has a hooked portion 61 on the upper end to swing radially and engage over the upper edge 43 of the inturned flange 42 on sleeve 23. The latch 60 is pivotally mounted on the coupling body by means of a transverse bore in its lower end 64. As seen best in FIGURE 3, a cap screw 66 is mounted transversely within the coupling body to have the threaded portion 67 engaged in the one wall of chamber 55 from the inside, while it is positioned on the other side by means of the usual head 68. A tubular sleeve 70 is mounted within a chamber 55 over the shank of the cap screw 66. Sleeve 70 is arranged to have such a length as to fit snugly at both sides against the side walls of the chamber 55 so as to be fixed in its axial position along the shank of the cap screw. The bore in the lower end 64 of the latch is journalled on the sleeve 70 and positioned against lateral movement by an enlarged portion 71 on the one side of sleeve 70. The latch is positioned at the other end of the sleeve 70 by means of a resilient annular ridge 73. The sleeve 70 is preferably made of a material such as a resilient plastic, so that the latch may be assembled on the sleeve 70 by inserting it from the smaller diameter end and snapping it resiliently over the annular ridge 73 to be positioned between ridge 73 and the enlarged portion 71.

The latch 60 is biased into engagement with the inturned flange 42 by means of a flat leaf spring 75. Spring 75 is formed of flat spring stock with an elongated closed slot extending down the center. When the spring 75 is in position around the latch 60 within the chamber 55, the bottom end 76 abuts against the bottom wall 56 of chamber 55. The spring 75 has a pair of arms 77 and 78 which extend around the sleeve 70 and upward along the sides of the latch 60, where they cross over so that the cross piece 79 at the upper end of the spring bears against the rear edge 62 of the latch 60 to force the hook 61 into contact along the upper edge 43 of flange 42.

A plunger 81 is slidably journalled in a bore 82 formed in a coupling body 50 to extend radially outward away from the front edge 63 of latch 60. The bore 82 terminates at its inner end in an enlarged counterbore 83 adjacent the chamber 55. The plunger 81 has a metal shank 84 with an enlarged finger button 85 on the outer end. A rubber or plastic sleeve 87 fits over the metal shank 84 and is rigidly secured thereto. At its inner end, the sleeve 87 is formed with an enlarged poppet portion 88 which is adapted to make sealing contact against a valve seat 89 formed at the juncture of the counterbore 83 and chamber 55. To hold the poppet 88 in contact with valve seat 89, the plunger 81 is spring biased outwardly by means of a coil spring 91 which is fitted around the sleeve 87 outwardly of the coupling body 50. At its outer end, spring 91 abuts against the button 85, while at its inner end it engages a seal washer 92 fitted within a counterbore 93 formed in the coupling body 50. A drain passage 95 extends downward within the coupling body 50 connecting the counterbore 83 to the exterior at the bottom end of the coupling body.

The remainder of the coupling body 50 includes a discharge bore 98 centrally positioned in the lower end. A threaded opening 99 extends into the discharge bore 98 to receive a suitable pipe or hose fitting 100 connected by the drain line to the appliance.

When the coupling is in use, the adapter 20 is intended to remain attached to the water supply at all times, and when the coupling body 50 is disconnected, the adapter 20 serves as an aerator for the water discharged from the supply line. In order to attach the coupling body 50, it is merely fitted over the sleeve 23 and pressed upwards until the lower end of the sleeve 23 causes the latch 60 to move inward against the bias of spring 75 until when the coupling body is in the upper position, the latch will then snap closed so that the hook portion 61 extends over the flange 42 to firmly hold the coupling body in place on the adapter. When the water is then turned on, it will flow through the adapter ring and into the chamber 55 on the coupling body. From here, the water will pass through the fitting 58 to the appliance, and the drain from the appliance will flow inward through the fitting 100 for discharge downwardly from the discharge bore 98.

When it is desired to disconnect the coupling, it is necessary to first release the pressure within the chamber 55. Of course, when this is done, the faucet is turned off so that there will be no additional water flowing into the chamber 55. However, when resilient hoses are used in the inlet line to the appliance, and the line is closed off in the appliance, the resilience of the hose walls will cause a residual pressure to remain within the chamber 55. To release this pressure, the plunger 81 is depressed to cause the poppet 88 to move away from its valve seat 89. This then vents or drains the chamber 55 through the counterbore 83 and the drain passage 95 so as to relieve all the pressure within the coupling. When the plunger 81 is further depressed, the poppet 88 engages the front edge 63 of the latch 60 to cause it to swing away so that the hook 61 becomes disengaged from the flange 42. When this is done, the coupling body 50 may then be moved downward and disengaged from the adapter 20.

Thus, actuation of the plunger 81 allows a simple one-handed operation in that the fingers of the hand may grip the body 50 while the thumb depresses the plunger. Since the initial movement of the plunger will automatically vent or drain the chamber 55 through the passage 95, it is not possible for any residual pressure to remain within the chamber 55 which would tend to cause the coupling body to be blown or forced off the adapter when the latch is disengaged. Furthermore, because the upper edge 43 of the flange 42 slopes upward, it is generally necessary to apply a slight upward movement to allow the hook 61 to swing inwardly, and this upward movement on the part of the coupling body 50 is not possible until the chamber 55 has been drained of any residual pressure. It should be noted that both the drain passage 95 and the discharge bore 98 cause the water to be drained in a downward direction in the same direction as the opening of the faucet so that the water will be directed into the drain or sink without splashing. Since the draining of the chamber 55 when the coupling is disconnected will allow the water remaining within the chamber 55 and within the supply line to be drained out, there will be no sudden release of water when the coupling body 50 is disengaged from the adapter ring 20. Thus, the coupling may be easily connected and disconnected with a minimum of leakage or splashing of water, and the action required is simple and straight forward so that it is not possible to either accidentally disconnect the coupling without draining the residual pressure nor is it possible to assemble the coupling body 50 on the adapter ring 20 in such a manner as to not have these members firmly locked together. Because of the arrangement of the hook 61 and the upper edge 43 of flange 42, the latch will not engage until the body 50 has been forced all the way inward on the adapter ring 20, at which point the hook will snap in place. If the coupling body 50 is not forced all the way onto the sleeve 23, the latch will not engage and when the water is turned on, the initial pressure of the water will immediately cause the couping body 50 to be forced off the adapter ring to indicate that the coupling body was not firmly latched in position.

While the preferred embodiment of the invention has been shown and described in detail, it is understood that various modifications and rearrangements will readily become apparent to those skilled in the art upon a complete understanding of the invention, and these may be resorted to without departing from the scope of the invention as defined in the following claims.

What is claimed is:

1. A quick disconnect fluid coupling comprising first and second coupling members, said first coupling member having an axial bore extending into one end, a chamber in said first member at the inner end of said bore, said second member having a cylindrical portion adapted to fit within said first member bore, sealing means carried by one of said members to make sealing engagement with the said member to prevent leakage from within the coupling to the exterior, said second member having an inlet bore extending axially therethrough, said second member having an inturned lip at the end thereof adjacent said chamber when said second member is interfitted within the bore of said first member, an outlet port on said first member from said chamber, a pivot shaft extending transversely across said chamber in said first member, a latch member pivotally mounted in said chamber on said pivot pin, said latch member having a hook portion at the end away from said pivot pin for engaging said inturned lip on said second member for securing said first and second members together, spring means in said chamber biasing said latch member into engagement with said inturned lip, a radial bore in said first member extending outward from said chamber to the exterior of said first member, a counterbore at the inner end of said radial bore, a valve seat intermediate said chamber and said counterbore, a vent passage extending from said counterbore to the exterior of said first member, a valve member slidably mounted in said radial bore, an operating button on the outer end of said valve member, a valve poppet on the inner end of said valve member adapted to make sealing contact with said valve seat, spring means biasing said valve member radially outward to urge said valve poppet into sealing contact with said valve seat, whereby inward movement of said valve member initially moves said valve popet away from said valve seat to connect said chamber to said vent passage, and further movement of said valve member causes said valve poppet to engage said latch member and shift said latch member out of engagement with said lip on said second member.

2. A quick disconnect fluid coupling comprising first and second coupling members, said first coupling member having an axial bore extending into one end, a chamber in said first member at the inner end of said bore, said second member having a cylindrical portion adapted to fit within said first member bore, sealing means carried by one of said members to make sealing engagement with the other of said members to prevent leakage from within the coupling to the exterior, said second member having an inlet bore extending axially therethrough, said second member having an inturned lip at the end thereof adjacent said chamber when said second member is interfitted within the bore of said first member, an outlet port on said first member from said chamber, a discharge bore on the other end of said first member spaced from said chamber by a wall, a return port opening into said discharge bore, a pivot shaft extending transversely across said chamber in said first member adjacent said wall, a latch member pivotally mounted in said chamber on said pivot pin, said latch member having a hook portion at the end away from said pivot pin for engaging said inturned lip on said second member for securing said first and second members together, spring means in said chamber biasing said latch member into engagement with said inturned lip, a radial bore in said first member extending outward from said chamber to the exterior of said first member, a counterbore at the inner end of said radial bore, a valve seat intermediate said chamber and said counterbore, a vent passage extending axially from said counterbore to the exterior of said first member adjacent said discharge bore, a valve member slidably mounted in said radial bore, an operating button on the outer end of said valve member, a valve poppet on the inner end of said valve member adapted to make sealing contact with said valve seat, spring means biasing said valve member radially outward to urge said valve poppet into sealing contact with said valve seat, whereby inward movement of said valve member initially moves said valve poppet away from said valve seat to connect said chamber to said vent passage, and further movement of said valve member causes said valve poppet to engage said latch member and shift said latch member out of engagement with said lip on said second member.

3. A quick disconnect fluid coupling comprising first and second coupling members, said first coupling member having an axial bore extending into one end, said one end having a cylindrical outer surface, a chamber in said first member at the inner end of said bore, said second member having a ring for attachment to a fluid supply, a sleeve secured to said ring and adapted to fit within said first member bore, said ring having a portion extending axially over the outer surface of said one end of said first member, sealing means carried by said ring to make sealing engagement with said cylindrical outer surface of said first member to prevent leakage from within the coupling to the exterior, said ring and said sleeve forming an inlet bore extending axially therethrough, said sleeve having an inturned lip at the end thereof adjacent said chamber when said sleeve is interfitted within the bore of said first member, an outlet port on said first member from said chamber, a pivot shaft extending transversely across said chamber in said first member, a latch member pivotally mounted in said chamber on said pivot pin, said latch member having a hook portion at the end away from said pivot pin for engaging said inturned lip on said second member for securing said first and second members together, spring means in said chamber biasing said latch member into engagement with said inturned lip, a radial bore in said first member extending outward from said chamber to the exterior of said first member, a counterbore at the inner end of said radial bore, a valve seat intermediate said chamber and said counterbore, a vent passage extending from said counterbore to the exterior of said first member, a valve member slidably mounted in said radial bore, an operating button on the outer end of said valve member, a valve poppet on the inner end of said valve member adapted to make sealing contact with said valve seat, spring means biasing said valve member radially outward to urge said valve poppet into sealing contact with said valve seat, whereby inward movement of said valve member initially moves said valve poppet away from said valve seat to connect said chamber to said vent passage, and further movement of said valve member causes said valve poppet to engage said latch member and shift said latch member out of engagement with said lip on said second member.

4. A quick disconnect fluid coupling comprising first and second coupling members, said first coupling member having an axial bore extending into one end, a chamber in said first member at the inner end of said bore, said second member having a cylindrical portion adapted to fit within said first member bore, sealing means carried by one of said members to make sealing engagement with the said member to prevent leakage from within the coupling to the exterior, said second member having an inlet bore extending axially therethrough, said second member having an inturned lip at the end thereof adjacent said chamber when said second member is interfitted within the bore of said first member, said lip having an upper edge sloping inwardly and upwardly, an outlet port on said first member from said chamber, a pivot shaft extending transversely across said chamber in said first member, a latch member pivotally mounted in said chamber on said pivot pin, said latch member having a hook portion at the end away from said pivot pin for engaging said upper edge of said inturned lip on said second member for securing said first and second members together, spring means in said chamber biasing said latch member into engagement with said inturned lip, a radial bore in said first member extending outward from said chamber to the exterior of said first member, a counterbore at the inner end of said radial bore, a valve seat intermediate said chamber and said counterbore, a vent passage extending from said counterbore to the exterior of said first member, a valve member slidably mounted in said radial bore, an operating button on the outer end of said valve member, a valve poppet on the inner end of said valve member adapted to make sealing contact with said valve seat, spring means biasing said valve member radially outward to urge said valve poppet into sealing contact with said valve seat, whereby inward movement of said valve member initially moves said valve poppet away from said valve seat to connect said chamber to said vent passage, and further movement of said valve member causes said valve poppet to engage said latch member and shift said latch member out of engagement with said upper edge of said lip on said second member.

References Cited by the Examiner

UNITED STATES PATENTS

| | | | |
|---|---|---|---|
| 3,064,678 | 11/62 | Shames | 137—562 |
| 3,084,713 | 4/63 | Parrish | 137—583 |
| 3,124,157 | 3/64 | Krzewina | 137—583 |

M. CARY NELSON, *Primary Examiner.*